(12) United States Patent
Iwasaki

(10) Patent No.: US 9,630,454 B2
(45) Date of Patent: Apr. 25, 2017

(54) PNEUMATIC TIRE

(71) Applicant: Sumitomo Rubber Industries, Ltd., Kobe-shi, Hyogo (JP)

(72) Inventor: Satoshi Iwasaki, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 602 days.

(21) Appl. No.: 14/030,063

(22) Filed: Sep. 18, 2013

(65) Prior Publication Data

US 2014/0238564 A1    Aug. 28, 2014

(30) Foreign Application Priority Data

Feb. 26, 2013    (JP) .................................. 2013-036135

(51) Int. Cl.
*B60C 11/12* (2006.01)
*B60C 11/03* (2006.01)

(52) U.S. Cl.
CPC ...... *B60C 11/0304* (2013.04); *B60C 11/0306* (2013.04); *B60C 2011/0346* (2013.04); *B60C 2011/0348* (2013.04); *B60C 2011/0365* (2013.04); *B60C 2011/0372* (2013.04); *B60C 2011/0388* (2013.04); *B60C 2011/1209* (2013.04); *B60C 2200/14* (2013.04)

(58) Field of Classification Search
CPC ............. B60C 2200/14; B60C 11/0306; B60C 11/0309; B60C 2011/0372; B60C 2011/0358; B60C 2011/0388; B60C 2011/0346; B60C 2011/0348; B60C 2011/1209; B60C 2011/0365

USPC ................. 152/209.2, 209.3; D12/551–556, D12/586–591
See application file for complete search history.

(56) References Cited

U.S. PATENT DOCUMENTS

| | | | | |
|---|---|---|---|---|
| D365,052 S | * | 12/1995 | Lash ............................ | D12/588 |
| D647,034 S | * | 10/2011 | Iwasaki ....................... | D12/586 |
| 2004/0020577 A1 | | 2/2004 | Hirai | |
| 2011/0041972 A1 | * | 2/2011 | Kageyama .......... | B60C 11/0306 152/209.15 |

FOREIGN PATENT DOCUMENTS

JP    2012-218652 A    11/2012

* cited by examiner

*Primary Examiner* — Michael H Wilson
*Assistant Examiner* — Philip N Schwartz
(74) *Attorney, Agent, or Firm* — Birch, Stewart, Kolasch & Birch, LLP

(57) ABSTRACT

A pneumatic tire includes a tread portion provided with a pair of shoulder main grooves adjacent to each tread edge, and shoulder lateral grooves extending from each shoulder main grooves to each tread edge. Each shoulder lateral groove includes an axially inner portion extending from the shoulder main groove with a first angle, an axially middle portion extending from the axially inner portion with a second angle larger than the first angle, and an axially outer portion extending from the axially middle portion with a third angle smaller than the second angle. The shoulder lateral grooves include first and second shoulder lateral grooves alternately arranged in a circumferential direction of the tire. The axially middle portion of the first shoulder lateral groove is disposed axially inwardly of the axially middle portion of the second shoulder lateral groove.

6 Claims, 8 Drawing Sheets

PNEUMATIC TIRE

BACKGROUND OF THE INVENTION

Field of the Invention

The present invention relates to a pneumatic tire, and in particular, relates to a pneumatic tire used for traveling on muddy roads.

Description of the Related Art

All-season tires for use on dry and muddy roads usually include a tread portion having a block pattern with a plurality of blocks divided between circumferential main grooves and lateral grooves, foe example. Conventionally, in order to improve muddy road performance of such tires, it is proposed increasing volume of lateral grooves for generating large traction on muddy roads by offering large mud shearing force.

The tire having lateral grooves having large groove volume, however, tends to have disadvantage with respect to noise performance on dry roads. For example, pipe resonance noise is often generated in the main grooves during traveling straight ahead on dry roads, and then it tends to easily spread outside the tire from the tread edges through lateral grooves.

Japanese unexamined Patent Application Publication No. 2012-218652 discloses an all-season tire that is expected to have a superior noise performance as well as muddy road performance.

However, such a tire disclosed above has room for improving noise performance on dry roads.

SUMMARY OF THE INVENTION

The present invention has been worked out in light of the circumstances described above, and has a main object of providing a pneumatic tire having an improved muddy road performance while maintaining noise performance.

According to one aspect of the present invention, there is provided a pneumatic tire including a tread portion having a pair of tread edges, the tread portion being provided with a pair of circumferentially and continuously extending shoulder main grooves adjacent to each tread edge and a plurality of shoulder lateral grooves each extending axially outwardly of the tire from each shoulder main groove to each tread edge. Each shoulder lateral groove includes an axially inner portion extending from the shoulder main groove having a first angle with respect to an axial direction of the tire, an axially middle portion extending from the axially inner portion having a second angle with respect to the axial direction of the tire larger than the first angle of the axially inner portion, and an axially outer portion extending from the axially middle portion having a third angle with respect to the axial direction of the tire smaller than the second angle of the axially middle portion. The shoulder lateral grooves include a first shoulder lateral groove and a second shoulder lateral groove which are alternately arranged in a circumferential direction of the tire. The axially middle portion of the first shoulder lateral groove is disposed axially inwardly of the axially middle portion of the second shoulder lateral groove.

In the first aspect of the present invention, the axially outer portion of the shoulder lateral groove may have a groove width increasing toward axially outwardly of the tire.

In the first aspect of the present invention, the third angle of the second shoulder lateral groove may be smaller than the third angle of the first shoulder lateral groove.

In the first aspect of the present invention, the axially middle portion of the second shoulder lateral groove may have a circumferential length larger than that of the axially middle portion of the first shoulder lateral groove.

In the first aspect of the present invention, the tread portion may comprise a shoulder block row that includes a plurality of shoulder blocks divided by the shoulder lateral grooves between the tread edge and the shoulder main groove. At least one shoulder block may be disposed a circumferentially extending longitudinal sipe that communicates between circumferentially adjacent shoulder lateral grooves.

DESCRIPTION OF THE EMBODIMENTS

An embodiment of the present invention will be explained below with reference to the accompanying drawings.

Figure 1:
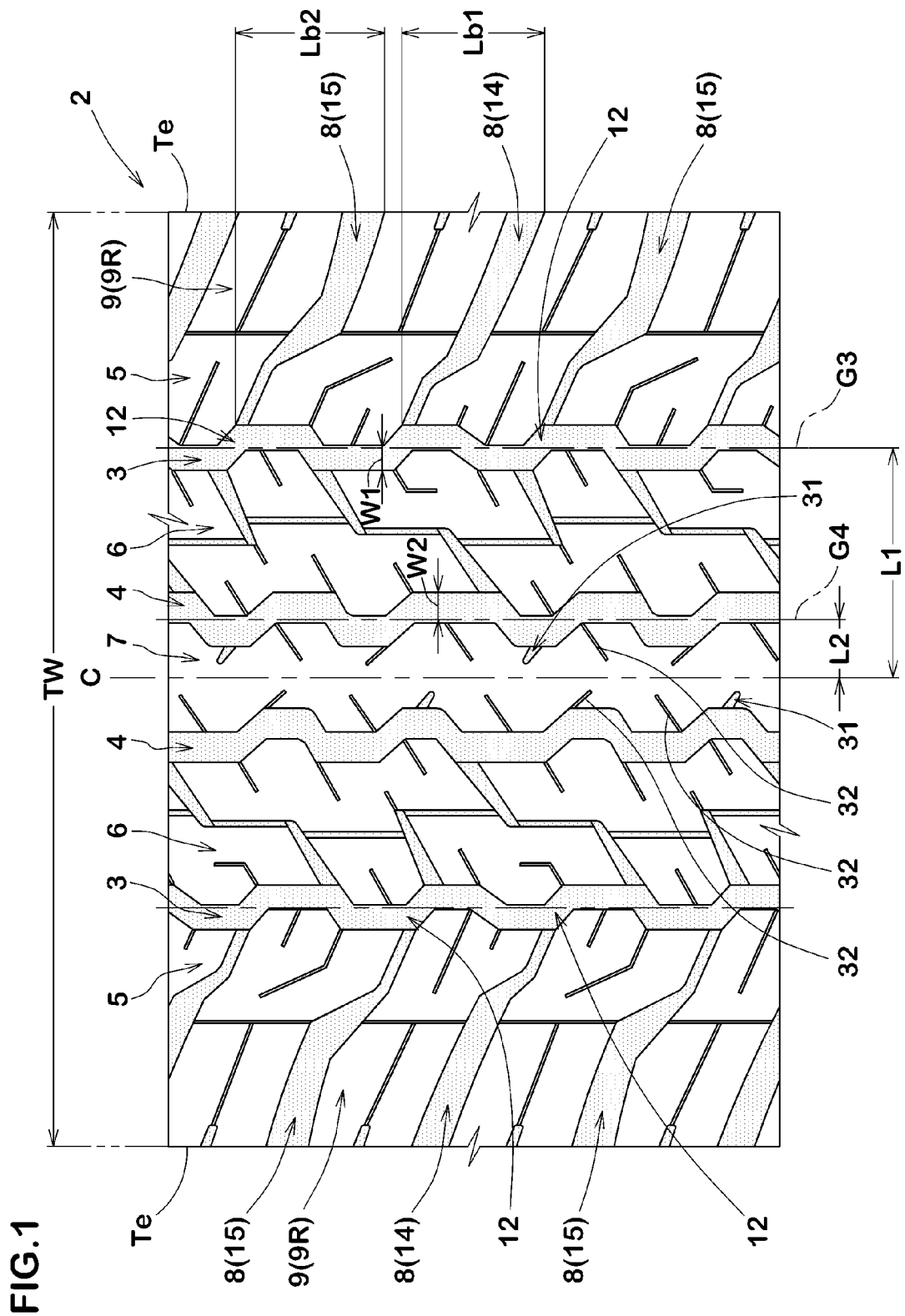
FIG. 1 is a development view of a tread portion of a pneumatic tire according to an embodiment of the present invention.

FIG. 1 illustrates a pneumatic tire 1 in accordance with the present embodiment that may be suitably embodied as an all-season tire for four-wheel drive vehicles.

The tire 1 includes a tread portion 2 having a pair of tread edges Te, Te. The tread portion 2 is provided with a pair of circumferentially and continuously extending shoulder main grooves 3, 3 adjacent to each tread edge Te and a pair of circumferentially and continuously extending center main grooves 4, 4 disposed axially inwardly of the shoulder main grooves 3, 3. Thus, the tread portion 2 is separated into a plurality of land portions that include a pair of shoulder portions 5 each of which is between adjacent shoulder main groove 3 and the tread edge Te, a pair of middle portions 6 each of which is between adjacent shoulder main groove 3 and center groove 4, and a center portion 7 between center main grooves 4, 4.

Here, tread edges Te are the axial outermost edges of the ground contacting patch of the tread portion 2 which occurs under a normally inflated loaded condition when the camber angle of the tire is zero. The normally inflated loaded condition is such that the tire is mounted on a standard wheel rim and inflated to a standard pressure and loaded with a standard tire load.

The tread width TW of the tread portion 2 is defined as the width measured under a normally inflated unloaded condition, as the axial distance between the tread edges Te, Te determined as above.

The normally inflated unloaded condition is such that the tire is mounted on the standard wheel rim and is inflated to the standard pressure but loaded with no tire load. In this application including specification and claims, various dimensions, positions and the like of the tire refer to those under the normally inflated unloaded condition of the tire unless otherwise noted.

The standard wheel rim is a wheel rim officially approved or recommended for the tire by standards organizations, i.e. JATMA, TRA, ETRTO, and the like which are effective in the area where the tire is manufactured, sold or used. For example, the standard wheel rim is the "standard rim" specified in JATMA, the "Measuring Rim" in ETRTO, and the "Design Rim" in TRA or the like.

The standard pressure and the standard tire load are the maximum air pressure and the maximum tire load for the tire specified by the same organization in the Air-pressure/Maximum-load Table or similar list. The standard pressure is the "maximum air pressure" in JATMA, the "Inflation Pressure" in ETRTO, and the maximum pressure given in the "Tire Load Limits at Various Cold Inflation Pressures" table in TRA or the like.

The standard tire load is the "maximum load capacity" in JATMA, the "Load Capacity" in ETRTO, and the maximum value given in the above-mentioned table in TRA or the like.

In case of passenger car tires, however, the standard pressure and standard tire load are uniformly defined by 180 kPa and 88% of the maximum tire load, respectively.

Figure 2A:
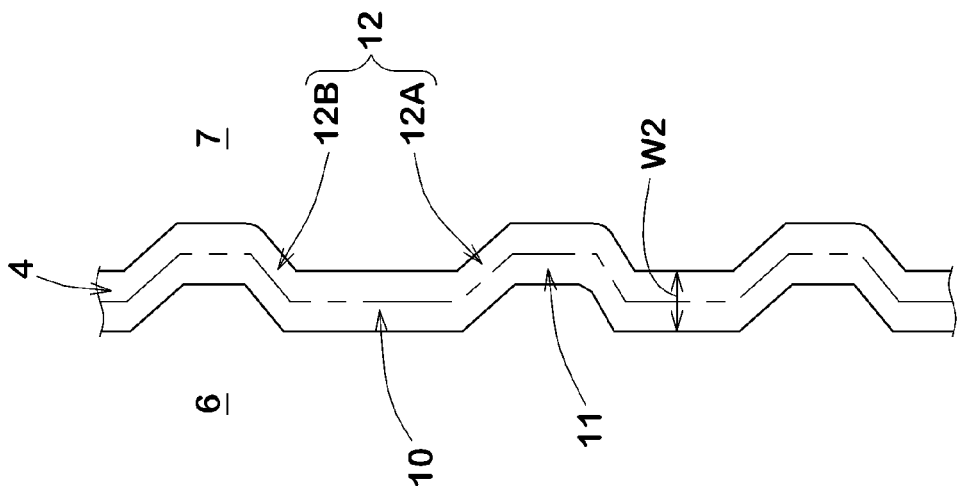
FIGS. 2A and 2B are respective partial enlarged views of a shoulder main groove and a center main groove of FIG. 1.
Figure 2B:
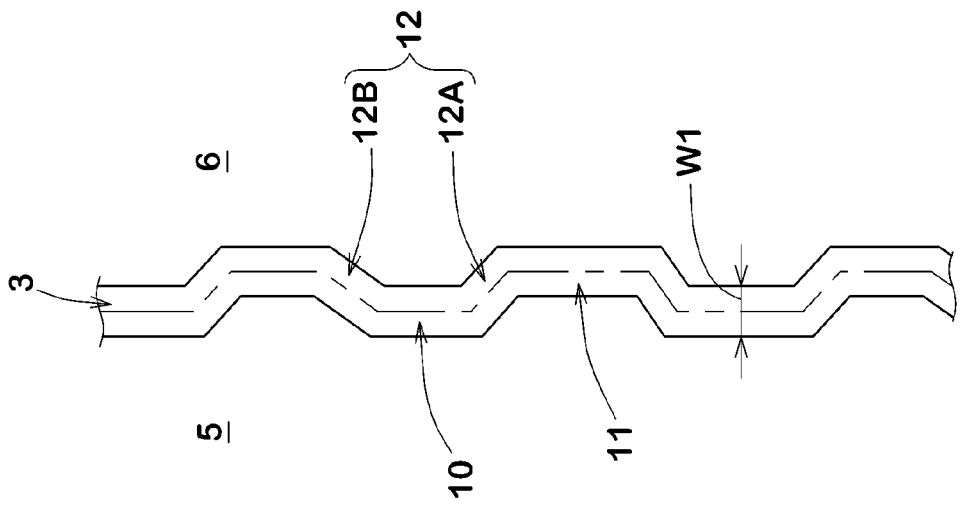

FIG. 2A illustrates the shoulder main groove 3 in the left side of FIG. 1, and FIG. 2B illustrates the center main groove 4 in the left side of FIG. 1. As shown in FIGS. 2A and 2B, each of the shoulder main groove 3 and the center main groove 4 extends in a trapezoid wave manner that includes a plurality of circumferentially extending axially outer parts 10, a plurality of circumferentially extending axially inner parts 11 disposed axially inwardly of the axially outer parts 10, and a plurality of inclined parts 12 connecting between the axially outer part 10 and the axially inner part 11. The axially outer parts 10 and the axially inner parts 11 may improve self-cleaning feature for the tread portion 2 that easily remove mud therefrom during traveling on muddy roads. The inclined parts 12 include first inclined parts 12A that are inclined at a first direction (downward to the right in this embodiment), and second inclined parts 12B that are inclined at a second direction (upward to the right in this embodiment) opposite to the first direction. Since such inclined parts 12 include lateral edge components, the inclined parts 12 may effectively bite loose muddy road surface, and firmly compresses it and shears for generating large mud shearing force. The shoulder main grooves 3 and the center main grooves 4, however, are particularly not limited the embodiment above.

In order to improve muddy road performance and noise performance in proper balance, the respective groove widths W1, W2 measured at the axially inner or outer parts of the shoulder main grooves 3 and the center main grooves 4 are preferably in a range of from 1.0% to 4.0% in relation to the tread width TW. Furthermore, groove depths of the shoulder main grooves 3 and the center main grooves 4 are preferably in a range of from 8.0 to 12.0 mm.

Referring back to FIG. 1, regarding the location for shoulder main groove 3, the axial distance L1 between the tire equator C and the amplitude centerline G3 of the shoulder main groove 3 is preferably in a range of from 15% to 35% in relation to the tread width TW. Regarding the location for center main groove 4, the axial distance L2 between the tire equator c and the amplitude centerline G4 of the center main groove 4 is preferably in a range of from 4% to 9% in relation to the tread width TW. Thus, mud is effectively removed from under the tread portion 2 during traveling so that muddy road performance may further be improved.

The shoulder portion 5 is provided with a plurality of shoulder lateral grooves 8 that extend beyond the tread edge Te from the shoulder main groove 3 to form a shoulder block row 9R including a plurality of shoulder blocks 9.

Figure 3:
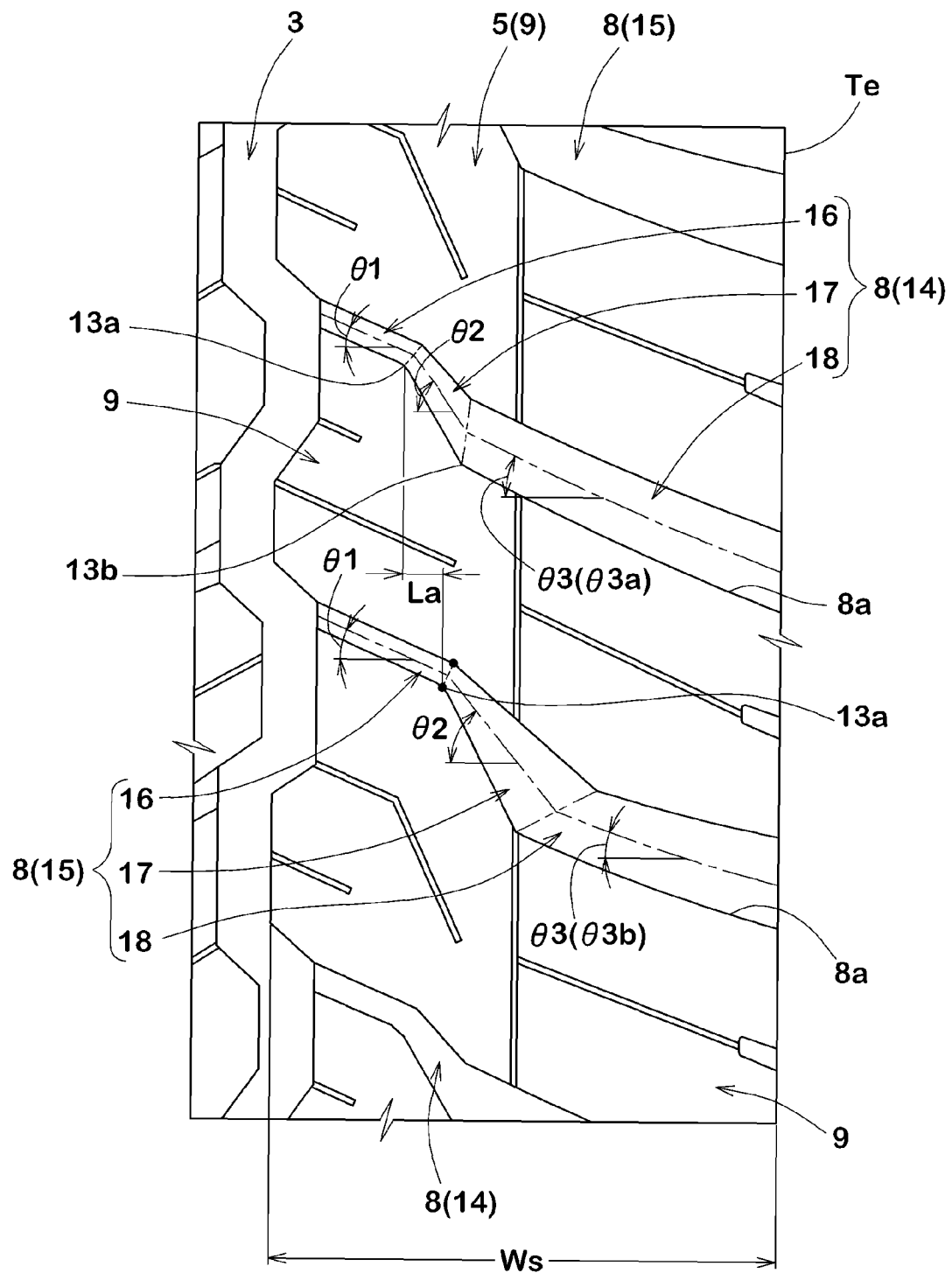
FIGS. 3 and 4 are partial enlarged views of shoulder portions in the right side of the tread portion of FIG. 1.

FIG. 3 illustrates a partial enlarged view of the shoulder portion 5 in the right side of the tread portion 2 of FIG. 1. As shown in FIG. 3, each shoulder lateral groove 8 includes an axially inner portion 16 extending from the shoulder main groove 3 having a first angle $\theta1$ with respect to the axial direction of the tire, an axially middle portion 17 extending from the axially inner portion 16 having a second angle $\theta2$ with respect to the axial direction of the tire larger than the first angle $\theta1$ of the axially inner portion 16, and an axially outer portion 18 extending from the axially middle portion 17 to the tread edge Te with a third angle $\theta3$ with respect to the axial direction of the tire smaller than the second angle $\theta2$ of the axially middle portion 17. The axially inner portion 16 and the axially outer portion 18 may generate large mud shearing force while pushing mud therein out from the tread edge Te for improving self-cleaning feature for the tread portion 2. The axially middle portion 17 may disturb the air flow with pipe resonance vibration that passes from the shoulder main groove 3 to the tread edge Te so that noise performance may further be improved.

In this embodiment, each of axially inner, middle and outer portions 16, 17 and 18 is respectively inclined at the same direction so as to smoothly push mud out of the tread edge Te.

The shoulder lateral grooves 8 include a plurality of first shoulder lateral grooves 14, and a plurality of second shoulder lateral grooves 15, wherein the first shoulder lateral groove 14 and the second shoulder lateral groove 15 are alternately arranged in the circumferential direction of the tire.

The axially middle portion 17 of the first shoulder lateral groove 14 is disposed axially inwardly of the axially middle portion 17 of the second shoulder lateral groove 15. Thus, since each shoulder block 9 has irregular rigidity along with the axial direction of the tire, it tends to vibrate with relatively large amplitude during traveling so that mud in the shoulder lateral groove 8 is easily removed therefrom.

Here, the location of the axially middle portion 17 of the shoulder lateral groove 8 is defined as an axially innermost point 13a on either groove edges 8a of the middle portion 17. In this embodiment of FIG. 3, the axially innermost point 13a is defined on the below groove edge 8a of the shoulder lateral groove 8. Furthermore, in the event that the axially inner portion 16 and the axially middle portion 17 are smoothly connected using a chamfered arc, the axially innermost point 13a mentioned above is defined as a center point on the chamfered arc.

Regarding the arrangement of first and second shoulder lateral grooves 14, 15, the axial length La between the axially inner most points 13a of first and second shoulder lateral grooves 14, 15 is preferably in a range of from 15% to 25% in relation to the maximum axial width ws of the shoulder block 9, in order to further improve the advantage above.

In order to further improve the advantage above, the axially outmost point 13b of the axially middle portion 17 of the first shoulder lateral groove 14 is preferably disposed axially outwardly of the axially innermost point 13a of the axially middle portion 17 of the second shoulder lateral groove 15.

Figure 4:
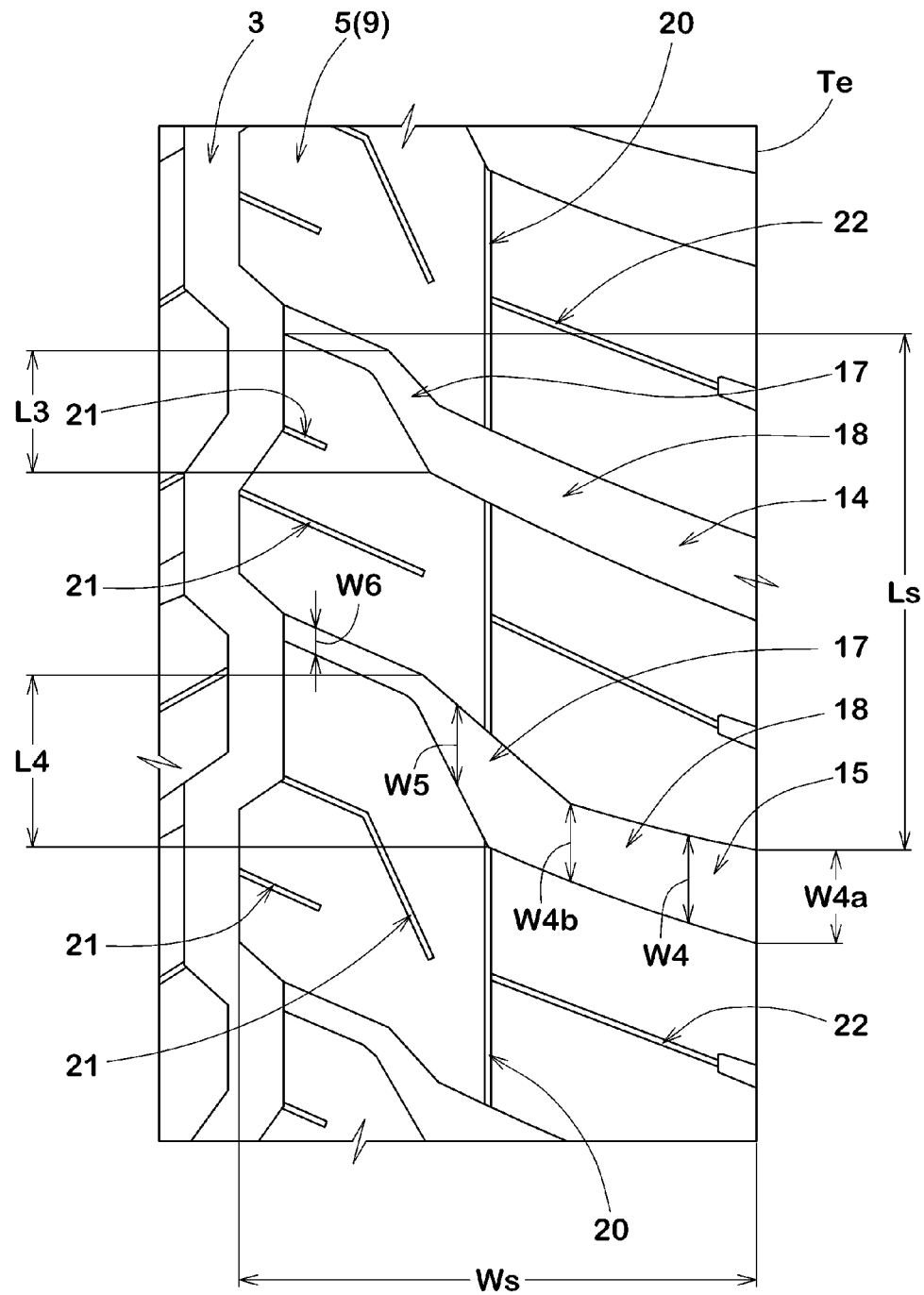

FIG. 4 also illustrates a partial enlarged view of the shoulder portion 5 in the right side of the tread portion 2 of FIG. 1. As shown in FIG. 4, the axially middle portion 17 of the second shoulder lateral groove 15 preferably has the circumferential length L4 larger than the circumferential length L3 of the axially middle portion 17 of the first shoulder lateral groove 14. Thus, the shoulder block 9 may be configured to have more preferable irregular rigidity along with the axial direction of the tire for improving self-cleaning feature for the tread portion 2 as mentioned above. In order to further improve muddy road performance as well as noise performance, the circumferential length L4 of the axially middle portion 17 of the second shoulder lateral groove 15 is preferably in a range of from 1.1 to 1.5 times in relation to the circumferential length L3 of the axially middle portion 17 of the first shoulder lateral groove 14.

In the same point of view above, the circumferential length L3 of the axially middle portion 17 of the first shoulder lateral groove 14 is preferably in a range of from 10% to 22% in relation to the circumferential maximum length Ls of the shoulder block 9.

The axially outer portion 18 of the shoulder lateral groove 8 has a groove width W4 measured along with the circumferential direction of the tire that is gradually increasing toward the tread edge Te. Thus, self-cleaning feature for the shoulder lateral groove 8 mentioned above may further be improved, especially during cornering. In order to further improve muddy road performance with self-cleaning feature for the tread portion 2 while maintaining an improved noise performance, the groove width W4a at the tread edge Te of the axially outer portion 18 is preferably in a range of from 1.10 to 1.35 times in relation to the groove width W4b at the axially innermost of the axially outer portion 18. In the same point of view above, the groove width W4 of the axially outer portion 18 is preferably in a range of from 10% to 30% in relation to the circumferential maximum length Ls of the shoulder block 9.

In this embodiment, the axially middle portion 17 also has the groove width W5 measured along with the circumferential direction of the tire that is gradually increasing toward the tread edge Te for further improving self-cleaning feature for the tread portion 2 above.

Although it is not particularly limited, the axially inner portion 16 of the shoulder lateral groove 8 preferably has the circumferential groove width W6 in a range of from 2.0% to 7.0% in relation to the circumferential maximum length Ls of the shoulder block 9 so as to effectively disturb the air flow with pipe resonance vibration that passes from the shoulder main groove 3 thereto.

Referring back to FIG. 3, the third angle θ3b of the axially outer portion 18 of the second shoulder lateral groove 15 is preferably smaller than the third angle θ3a of the axially outer portion 18 of the first shoulder lateral groove 14. Thus, circumferential rigidity of the shoulder block 9 between the adjacent axially outer portions 18, 18 tends to decrease toward the tread edge Te, whereby self-cleaning feature for the tread portion 2 on the shoulder lateral groove 8 is further improved. In order to further improve the advantage above, the third angle θ3b of the axially outer portion 18 of the second shoulder lateral groove 15 is preferably in a range of from 5 to 25 degrees with respect to the axial direction of the tire. Furthermore, the difference θ3a−θ3b between the third angles θ3a−θ3b is preferably in a range of from 5 to 15 degrees.

In order to further improve muddy road performance as well as noise performance, the first angle θ1 of the axially inner portion 16 is preferably in a range of from 15 to 35 degrees. Similarly, the second angle θ2 of the axially middle portion 17 is preferably in a range of from 40 to 60 degrees.

Referring back to FIG. 1, the circumferential length Lb1 of the first shoulder lateral groove 14 is preferably in a range of from 0.9 to 1.1 times in relation to the circumferential length Lb2 of the second shoulder lateral groove 15. Thus, self-cleaning feature for tread portion 2 and disturbing for pipe resonance noise in the first and second shoulder lateral grooves 14 and 15 is further improved.

In this embodiment, each shoulder lateral groove 8 is communicated with the shoulder main groove at its outer part 10 including the corner point between the inclined part 12 and the outer part 10 so that the inclined part 12 and the axially inner portion 16 are smoothly connected each other. Thus, mud in the shoulder main groove 3 is smoothly pushed into each axially inner portion 16 of the shoulder lateral groove 8, due to a contact pressure during traveling. Furthermore, the inclined part 12 and the axially inner portion 16 may generate large mud shearing force by shearing an axially long compressed mud formed therein so that muddy road performance is further improved.

In order to effectively prevent pipe noise resonance transmitted into the shoulder lateral groove 8 from the shoulder main groove 3, the axially inner portion 16 of the shoulder lateral groove 8 preferably has its groove depth (not shown) in a range of from 40% to 60% in relation to the groove depth of the shoulder main groove 3. In order to further generate large mud shearing force, the axially outer portion 18 of the shoulder lateral groove 8 preferably has its groove depth in a range of from 75% to 95% in relation to the groove depth of the shoulder main groove 3. The axially middle portion 17 of the shoulder lateral groove 8 preferably has its groove depth increasing from the axially inner portion 16 to the axially outer portion 18.

As shown in FIG. 4, the shoulder block 9 is disposed a circumferentially extending longitudinal sipe 20, an axially inner sipe 21 disposed axially inwardly of the longitudinal sipe 20, and an axially outer sipe 22 disposed axially outwardly of the longitudinal sipe 20. Thus, since these sipes 20, 21 and 22 make the shoulder block soften in well balance manner, the shoulder block 9 further vibrates during traveling, whereby self-cleaning feature for the tread portion 2 may further be improved.

Here, a sipe is defined as a thin slit or the like, having a width of less than 2 mm.

The longitudinal sipe 20 is a full-opened sipe having its both ends each of which communicates with the other groove. The longitudinal sipe 20 is preferably disposed in a center region having the axial width of 20% in relation to the axial maximum width Ws of the shoulder block 9.

The axially inner sipe 21 is a semi-opened sipe that has its one end communicated with the shoulder main groove 3 and its other end terminating within the shoulder block without reaching the other groove or sipe. The axially inner sipe 21 makes the shoulder block soften at its axially inner part. Thus, the axially inner part of the shoulder block 9 tends to vibrate with large during traveling so that mud clogged in the shoulder lateral groove 3 is effectively removed therefrom. In order to further improve the advantage above, the axially inner and outer sipes 21 and 22 have the same inclination with the shoulder lateral groove 8.

The longitudinal sipe 20, axially inner sipe 21 and axially outer sipe 22 preferably have the respective widths in a range of from 0.6 to 1.0 mm. The longitudinal sipe 20, axially inner sipe 21 and axially outer sipe 22 preferably have the respective depths in a range of from 50% to 75% in relation to the groove depth of the axially outer portion 18 of the shoulder lateral groove 8.

Figure 5:
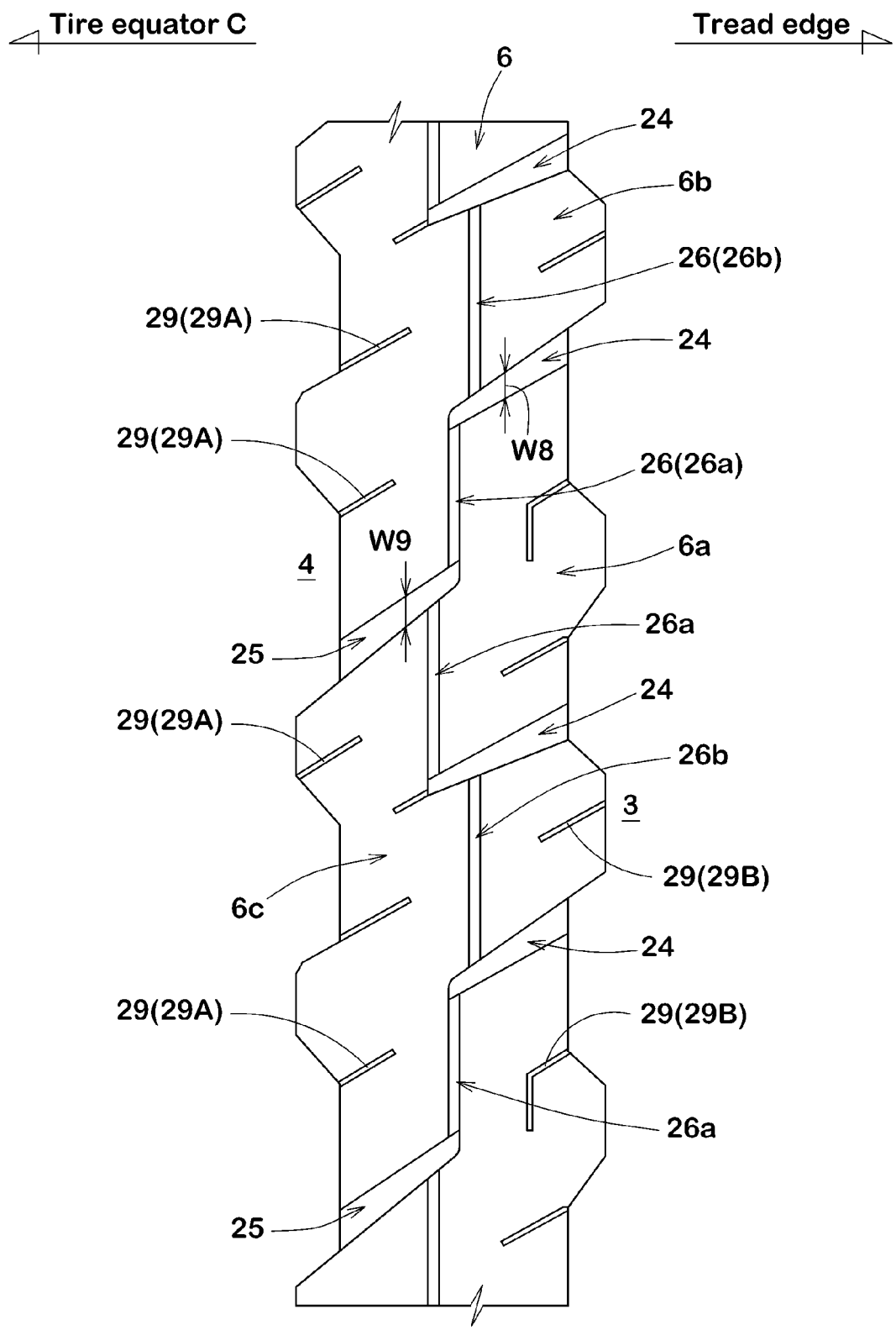
FIG. 5 is a partial enlarged view of a middle portion in the right side of the tread portion of FIG. 1.

FIG. 5 illustrates a partial enlarged view of the middle portion 6 in the right side of the tread portion 2 of FIG. 1. Referring to FIG. 5, the middle portion 6 is provided with a plurality of outer middle lug grooves 24, a plurality of inner middle lug grooves 25, and a plurality of longitudinal sub grooves 26.

Each outer middle lug groove 24 extends from the shoulder main groove 3 to its axially inner end that terminates within the middle portion 6. Each inner middle lug groove 25 extends from the center main groove 4 to its axially outer end that terminates within the middle portion 6.

The longitudinal sub grooves 26 include first longitudinal sub grooves 26a and second longitudinal sub grooves 26b. Each first longitudinal sub groove 26a connects between the outer middle lug groove 24 and the inner middle lug groove 25. Each second longitudinal sub groove 26b connects between adjacent outer middle lug grooves 24. Thus, the middle portion 6 is divided into a block row that includes a first outer block 6a, a second outer block 6b, and an inner block 6c.

The first outer block 6a is defined among the shoulder main groove 3, outer middle lug grooves 24, the inner middle lug groove 25, and the first sub longitudinal grooves 26a. The second outer block 6b is defined among the shoulder main groove 3, outer middle lug grooves 24, and the second sub longitudinal groove 26b. The inner block 6c is defined among the center main groove 4, outer middle lug grooves 24, inner middle lug grooves 25, the second sub longitudinal groove 26b, and the first sub longitudinal grooves 26a. Since the middle portion 6 configured to the above tends to have low rigidity, mud in the outer middle lug grooves 24 and inner middle lug grooves 25 is easily removed therefrom.

The outer middle lug grooves 24 have groove widths W8 measured along the circumferential direction of the tire increasing toward the shoulder main groove 3. The inner middle lug grooves 25 have groove widths W9 measured along the circumferential direction of the tire increasing toward the center main groove 4.

Each of the inner blocks 6c is provided with a first semi-opened middle sipe 29A that straightly extends and is inclined at one direction (upward to the right in this embodiment) with respect to the axial direction of the tire. The first semi-opened middle sipe 29A extends from the center main groove 4 to its axially outer end that terminates within the middle portion 6.

Each of the first outer blocks 6a and the second blocks 6b is provided with a second semi-opened sipe 29B that straightly extends and is inclined at one direction (upward to the right in this embodiment) with respect to the axial direction of the tire. The second semi-opened middle sipe 29B extends from the shoulder main groove 3 to its axially inner end that terminates within the middle portion 6. These semi-opened sipes 29A, 29B may adjust rigidity of the middle portion 6 on its axially both sides so that each mud in the outer middle lug grooves 24, inner middle lug grooves 25, shoulder main groove 4 and center main groove 3 is further easily removed therefrom.

Referring back to FIG. 1, the center portion 7 is provided with a center lug groove 31 and a center sipe 32. Each of the center lug groove 31 and the center sipe 32 extends from the center main groove 4 to its axially inner end that terminates without reaching the tire equator C. Since the center portion 7 is configured to have low rigidity at the axially both ends, the center portion 7 may give vibration to mud clogged in the center main groove 4 so as to easily be removed it from there during traveling.

The present invention is more specifically described and explained by means of the following Examples and References. It is to be understood that the present invention is not limited to these Examples and embodiments described above.

Comparison Test

In order to confirm the advantage of the invention, pneumatic tires having a tire size of 285/60R18 with basic tread patterns of FIG. 1 except for details shown in Table 1 were made and tested. Major common specifics of tires and test method are as follows.

Details of Test Tires:
  Rim size: 18×8.0 J
  Internal pressure: 230 kPa
  Tread width TW: 224 mm
  Shoulder main groove depth: 10.0 mm
  Center main groove depth: 10.0 mm
  Axially inner portion of the shoulder lateral groove depth: 4.5 mm
  Axially outer portion of the shoulder lateral groove depth: 9.0 mm
  Axially middle portion of the shoulder lateral groove depth: 4.5 to 9.0 mm (gradually increasing toward the axially outer portion)
  Outer and inner lug groove depths: 8.0 mm
  Center lug groove depth: 5.0 mm
  Ratio of each sipe depth to shoulder main groove depth: 30% to 80%

Noise Performance Test:

A four-wheel drive car with a displacement of 4,600 cc provided with test tires as four wheels was driven at a speed of 50 km/h on a road noise measurement test course having rough asphalt surface, and the internal vehicle noise was measured with a microphone set at the driver's right ear position. Based on the noise measured above, the peak sound level of the pipe resonance noise ranging about 240 Hz was analyzed. The results are indicated the reciprocal number of the peak sound level in Table 1 by an index based on Ref.1 being 100. The larger the index number, the better the noise performance is.

Muddy Road Performance Test:

The test vehicle above was driven by a professional test driver on loose muddy road, and evaluated traction force when starting and accelerating of each test tire according to his feeling. The results are shown with a score of 100 representing a value in Ref.1. The larger the value, the better the performance is.

Test results are shown in Table 1.

TABLE 1

Figure 7:
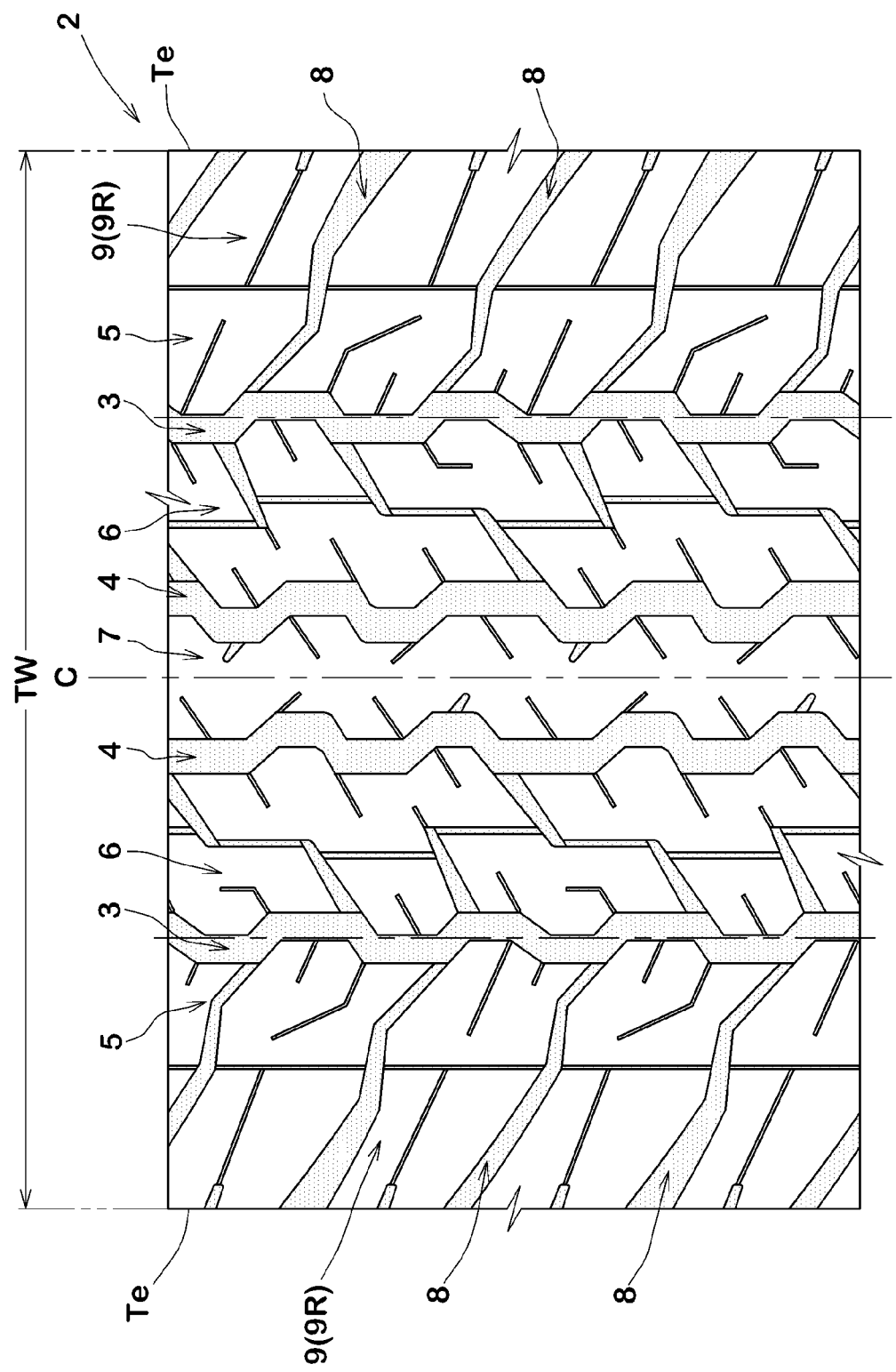
FIGS. 7 and 8 are development views of the tread portion according to comparative example of the present invention.
Figure 8:
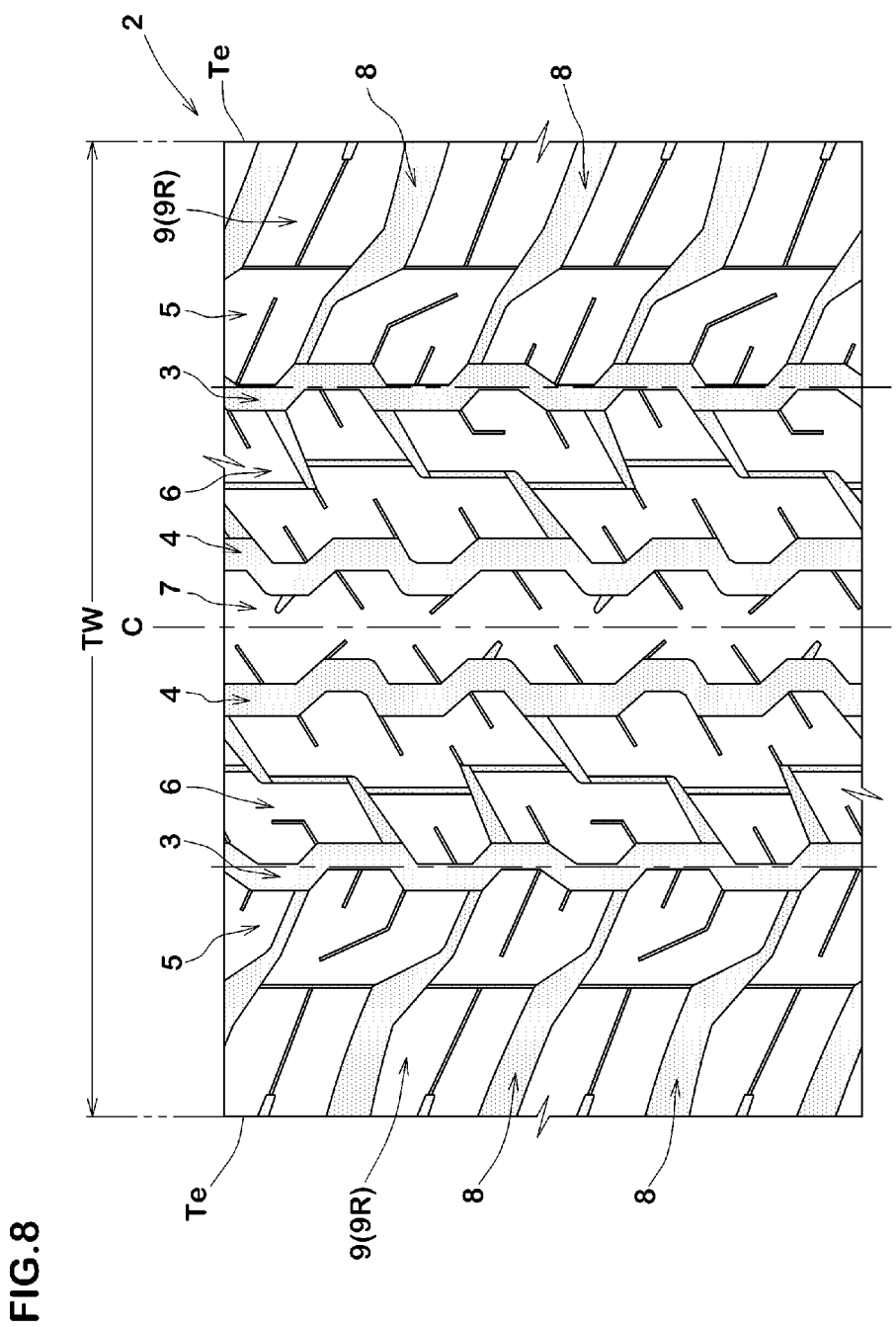

| Tread pattern | Ref. 1 FIG. 7 | Ref. 2 FIG. 8 | Ex. 1 FIG. 1 | Ex. 2 FIG. 1 | Ex. 3 FIG. 1 | Ex. 4 FIG. 1 | Ex. 5 FIG. 1 | Ex. 6 FIG. 1 | Ex. 7 FIG. 1 | Ex. 8 FIG. 1 |
| --- | --- | --- | --- | --- | --- | --- | --- | --- | --- | --- |
| Ratio La/Ws (%) | 20 | — | 20 | 10 | 15 | 25 | 30 | 20 | 20 | 20 |
| Ratio W4a/W4b | 1.2 | 1.2 | 1.2 | 1.2 | 1.2 | 1.2 | 1.2 | 1.05 | 1.1 | 1.35 |
| θ3a-θ3b (deg.) | 10 | 10 | 10 | 10 | 10 | 10 | 10 | 10 | 10 | 10 |
| Ratio L4/L3 | 1.3 | 1.3 | 1.3 | 1.3 | 1.3 | 1.3 | 1.3 | 1.3 | 1.3 | 1.3 |
| Muddy road performance [Score] | 100 | 102 | 115 | 105 | 110 | 110 | 105 | 100 | 105 | 120 |
| Noise performance [Index] | 100 | 100 | 100 | 100 | 100 | 100 | 100 | 110 | 105 | 90 |

TABLE 1-continued

Figure 6:
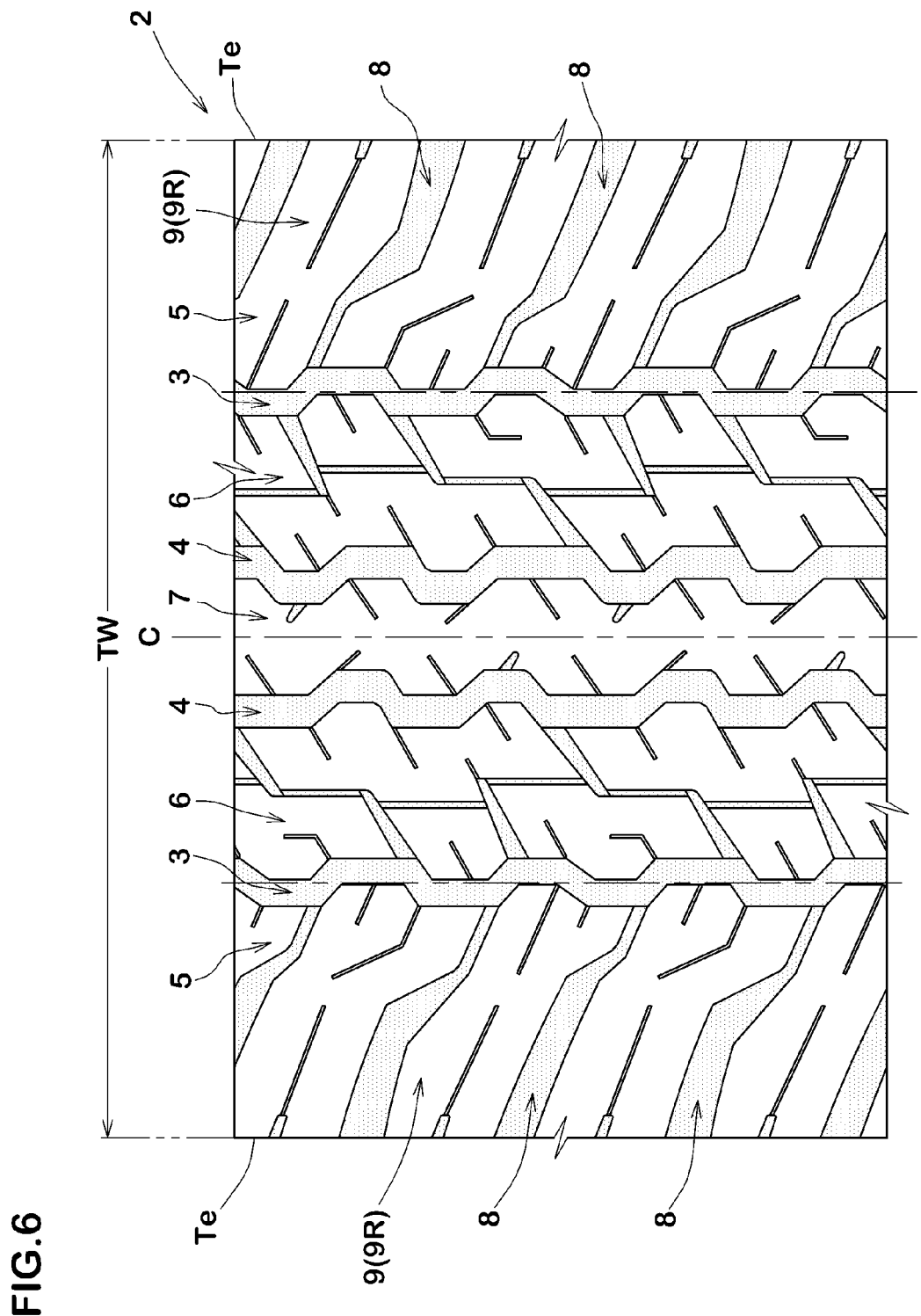
FIG. 6 is a development view of the tread portion according to another embodiment of the present invention.

| Tread pattern | Ex. 9 FIG. 1 | Ex. 10 FIG. 1 | Ex. 11 FIG. 1 | Ex. 12 FIG. 1 | Ex. 13 FIG. 1 | Ex. 14 FIG. 1 | Ex. 15 FIG. 1 | Ex. 16 FIG. 1 | Ex. 17 FIG. 1 | Ex. 18 FIG. 6 |
|---|---|---|---|---|---|---|---|---|---|---|
| Ratio La/Ws (%) | 20 | 20 | 20 | 20 | 20 | 20 | 20 | 20 | 20 | 20 |
| Ratio W4a/W4b | 1.4 | 1.2 | 1.2 | 1.2 | 1.2 | 1.2 | 1.2 | 1.2 | 1.2 | 1.2 |
| θ3a-θ3b (deg.) | 10 | 2 | 5 | 15 | 20 | 10 | 10 | 10 | 10 | 10 |
| Ratio L4/L3 | 1.3 | 1.3 | 1.3 | 1.3 | 1.3 | 1 | 1.1 | 1.5 | 1.6 | 1.3 |
| Muddy road performance [Score] | 125 | 105 | 110 | 110 | 105 | 105 | 110 | 110 | 105 | 105 |
| Noise performance [Index] | 85 | 100 | 100 | 100 | 100 | 100 | 100 | 100 | 100 | 100 |

From the test results, it was confirmed that Example tires in accordance with the present embodiment of the invention can be effectively improved muddy road performance while maintaining noise performance. Through the other experiments used tires having the different size, the same results as mentioned above was confirmed.

What is claimed is:

1. A pneumatic tire comprising:
   a tread portion having a pair of tread edges, the tread portion being provided with a pair of circumferentially and continuously extending shoulder main grooves adjacent to each tread edge and a plurality of shoulder lateral grooves each extending axially outwardly of the tire from each shoulder main groove to each tread edge,
   each shoulder lateral groove comprising:
   an axially inner portion extending from the shoulder main groove having a first angle with respect to an axial direction of the tire;
   an axially middle portion extending from the axially inner portion having a second angle with respect to the axial direction of the tire larger than the first angle of the axially inner portion, wherein the second angle is in a range of from 40 to 60 degrees; and
   an axially outer portion extending from the axially middle portion having a third angle with respect to the axial direction of the tire smaller than the second angle of the axially middle portion, and
   the shoulder lateral grooves including a first shoulder lateral groove and a second shoulder lateral groove, the axially middle portion of the first shoulder lateral groove disposed axially inwardly of the axially middle portion of the second shoulder lateral groove, the first shoulder lateral groove and the second shoulder lateral groove alternately arranged in a circumferential direction of the tire,
   wherein the tread portion comprises a shoulder block row that includes a plurality of shoulder blocks each divided by adjacent first and second shoulder lateral grooves between one of the tread edges and one of the shoulder main grooves,
   and wherein one of the shoulder blocks is provided with a circumferentially extending longitudinal sipe that extends from the axially outer portion of the first lateral groove to the middle portion of the second shoulder lateral groove.

2. The tire according to claim 1,
   wherein the axially outer portion of the shoulder lateral groove has a groove width increasing toward axially outwardly of the tire.

3. The tire according to claim 1,
   wherein the third angle of the second shoulder lateral groove is smaller than the third angle of the first shoulder lateral groove.

4. The tire according to claim 1,
   wherein the axially middle portion of the second shoulder lateral groove has a circumferential length larger than that of the axially middle portion of the first shoulder lateral groove.

5. The tire according to claim 1,
   wherein one of the axially middle portions of the shoulder lateral grooves has a groove width measured along the circumferential direction of the tire, and the groove width gradually increases toward the tread edge.

6. The tire according to claim 1,
   wherein the axially middle portions of the shoulder lateral grooves have groove widths measured along the circumferential direction of the tire, and the groove widths gradually increase toward the tread edge.

* * * * *